(12) United States Patent
Yamano

(10) Patent No.: US 9,417,674 B2
(45) Date of Patent: Aug. 16, 2016

(54) POWER SUPPLY APPARATUS, POWER SUPPLY METHOD, AND STORAGE MEDIUM

(71) Applicant: CANON KABUSHIKI KAISHA, Tokyo (JP)

(72) Inventor: Hiroshi Yamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/245,914

(22) Filed: Apr. 4, 2014

(65) Prior Publication Data

US 2014/0304531 A1 Oct. 9, 2014

(30) Foreign Application Priority Data

Apr. 8, 2013 (JP) ................................. 2013-080534

(51) Int. Cl.
*G06F 1/26* (2006.01)

(52) U.S. Cl.
CPC . *G06F 1/26* (2013.01); *G06F 1/266* (2013.01)

(58) Field of Classification Search
None
See application file for complete search history.

(56) References Cited

U.S. PATENT DOCUMENTS

2012/0249051 A1* 10/2012 Son .................... H02J 7/025
320/106
2012/0293010 A1* 11/2012 Lee .................... H02J 17/00
307/104

FOREIGN PATENT DOCUMENTS

JP 2012-010447 A 1/2012

* cited by examiner

*Primary Examiner* — Paul Yanchus, III
(74) *Attorney, Agent, or Firm* — Canon U.S.A., Inc. IP Division

(57) ABSTRACT

A power supply apparatus that wirelessly supplies power includes a detection unit configured to detect a power receiving apparatus, a receiving unit configured to receive, from the power receiving apparatus detected by the detection unit, identification information identifying the power receiving apparatus, a power-supply control unit configured to compare the identification information received by the receiving unit with identification information stored in a storage unit and identifying an allowed device for which power supply is allowed, thereby allowing power supply to the power receiving apparatus when both identification information match each other, and a power supply unit configured to perform the power supply to the power receiving apparatus for which the power supply is allowed by the power-supply control unit.

7 Claims, 8 Drawing Sheets

FIG. 1
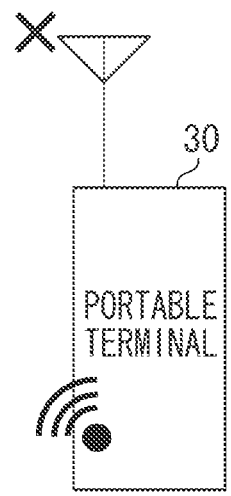
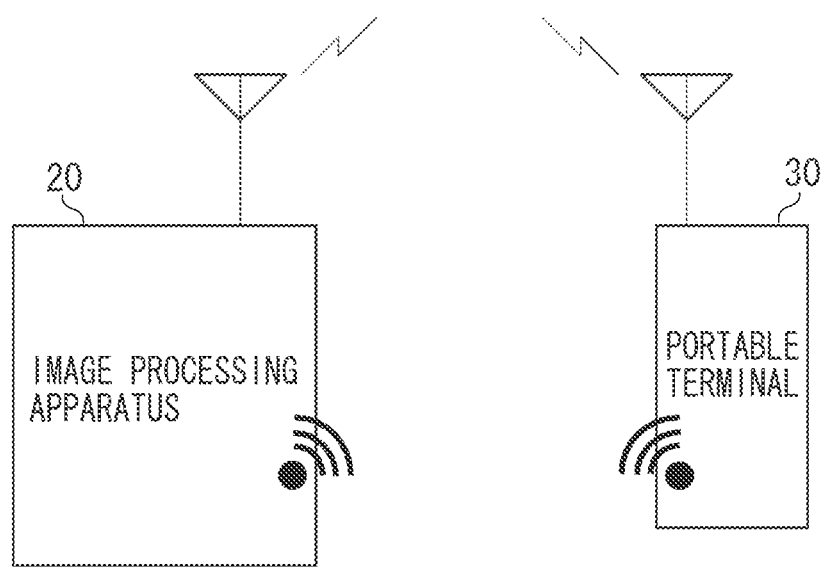

FIG. 3

| AUTHENTICATION KEY IN WIRELESS COMMUNICATION | REGISTERED ID (DEVICE NAME) | EXECUTION HISTORY | BILLING HISTORY |
|---|---|---|---|
| abcdefg123 | DEVICE X | UI 1 TIME | |
| hijklmn456 | DEVICE Y | Direct Print 2 TIMES | |
| opqrstu789 | DEVICE Z | 0 TIMES | |

POWER SUPPLY APPARATUS, POWER SUPPLY METHOD, AND STORAGE MEDIUM

BACKGROUND

1. Field

Aspects of the present invention generally relate to a power supply apparatus, a power supply method, and a storage medium.

2. Description of the Related Art

A mobile device such as a tablet personal computer (PC) and a smartphone is used for a user interface (UI) or direct print in an image processing apparatus such as a multifunction peripheral and a printer. The number of such scenes has been increasing. In particular, the number of cases in which the mobile device is used as the UI of the multifunction peripheral installed at a place like a convenience store has been increasing.

Meanwhile, there is a mobile device mounted with a wireless communication function such as Wireless Fidelity (Wi-Fi®) and a wireless charging function (such as Qi® standard). The number of mobile devices of this type has been increasing. In the Qi standard, a control protocol is set between a power supply device and a power receiving device, so that power supply can be performed between devices complying with the same standard. Therefore, in any combination of a power supply device and a power receiving device, charging without authentication can be performed regardless of manufacturer, when these devices support the Qi.

In this connection, a service of supplying power from the multifunction peripheral or the like to the mobile device has been proposed. This service is provided when the mobile device uses a service such as printing in the multifunction peripheral or the like installed at a place like a convenience store.

As for wireless communication technology, for example, Japanese Patent Application Laid-Open No. 2012-10447 discusses a technique that determines whether to turn ON or OFF a power supply function of a power supply device by detecting the distance between the power supply device and a power receiving device, using wireless communication.

However, as described above, according to the wireless charging standard, the power supply apparatus supplies the power to the power receiving device without authenticating the power receiving device, when these devices comply with the standard. Therefore, for the multifunction peripheral or the like installed at a place like a convenience store, it is expected to provide a technique that restricts power supply targets. For example, the power supply targets may be restricted by providing a power supply service only to a power receiving device using a service such as printing.

SUMMARY

An aspect of the present invention is generally directed to a power supply apparatus capable of appropriately controlling a power supply target.

According to an aspect of the present invention, a power supply apparatus that wirelessly supplies power includes a detection unit configured to detect a power receiving apparatus, a receiving unit configured to receive, from the power receiving apparatus detected by the detection unit, identification information identifying the power receiving apparatus, a power-supply control unit configured to compare the identification information received by the receiving unit with identification information stored in a storage unit and identifying an allowed device for which power supply is allowed, thereby allowing power supply to the power receiving apparatus when both identification information match each other, and a power supply unit configured to perform the power supply to the power receiving apparatus for which the power supply is allowed by the power-supply control unit.

Further features of the present disclosure will become apparent from the following description of exemplary embodiments with reference to the attached drawings.

BRIEF DESCRIPTION OF THE DRAWINGS

FIG. 1 is a diagram illustrating a wireless power-supply system.

FIG. 3 is a diagram illustrating an example of a management table.

DESCRIPTION OF THE EMBODIMENTS

Various exemplary embodiments will be described in detail below with reference to the drawings.

FIG. 1 is a diagram illustrating a wireless power-supply system. The wireless power-supply system includes an image processing apparatus 20 serving as a power supply apparatus, and a portable terminal 30 serving as a power receiving apparatus. The image processing apparatus 20 provides a service as described below. The image processing apparatus 20 receives print data from the portable terminal 30 or a PC (not illustrated), via an external interface such as a network interface (I/F) and a local interface (I/F). The image processing apparatus 20 then prints the received print data on paper, or temporarily stores the received print data. Further, the image processing apparatus 20 wirelessly supplies power to another device (the portable terminal 30).

The portable terminal 30 is an input/output device. For example, the portable terminal 30 functions as a user interface (UI) of the image processing apparatus 20. The portable terminal 30 functions as an input device, when contents such as a document and a photograph are printed through direct print based on wireless communication. Further, the portable terminal 30 wirelessly receives power from the image processing apparatus 20, to charge a battery included in the portable terminal 30. The image processing apparatus 20 and the portable terminal 30 transmit and receive information for authentication and the like, to and from each other by wireless communication.

Figure 2:
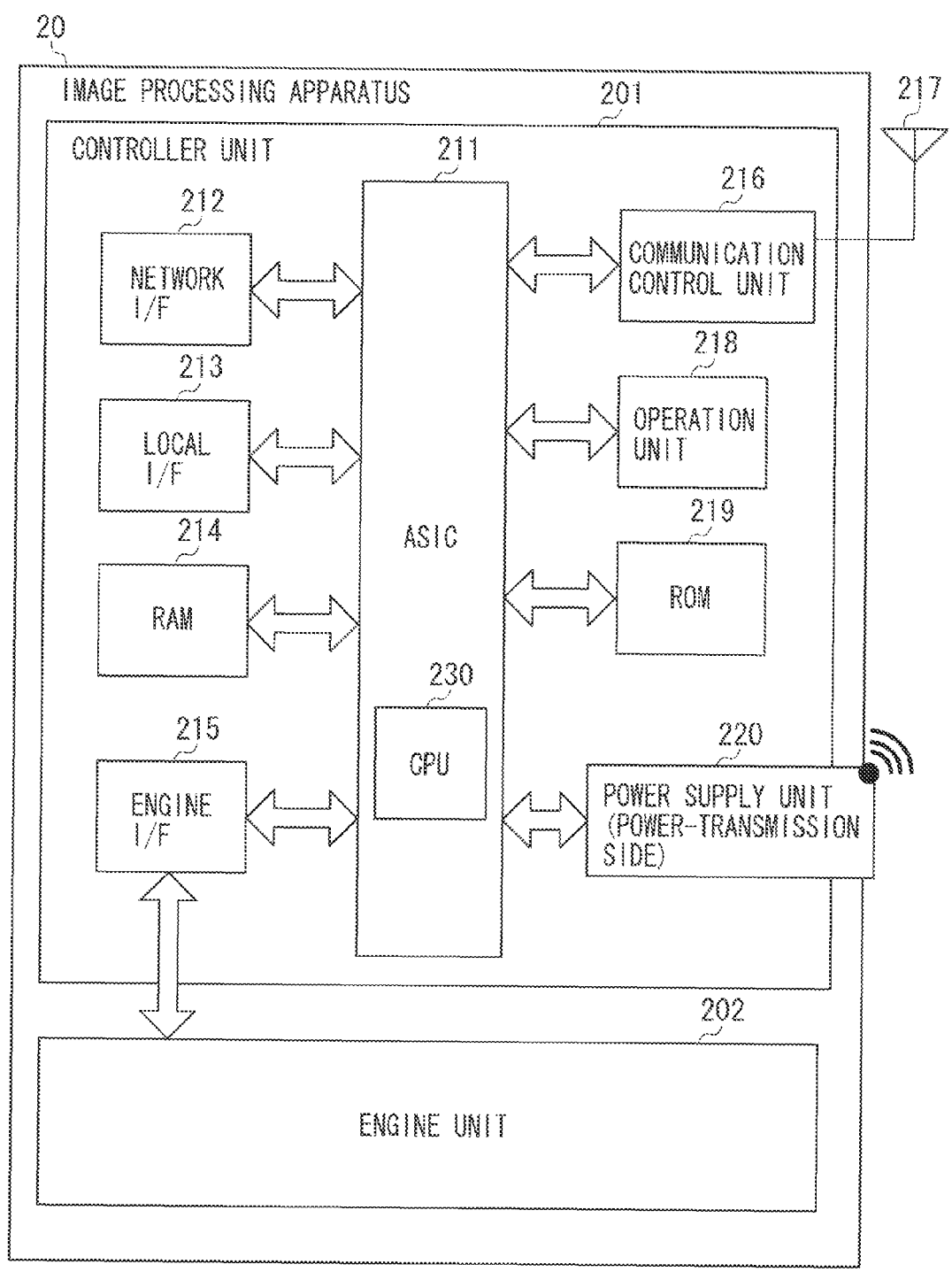
FIG. 2 is a diagram illustrating an image processing apparatus.

FIG. 2 is a diagram illustrating the image processing apparatus 20. The image processing apparatus 20 includes a controller unit 201 and an engine unit 202. The controller unit 201 processes print data. The engine unit 202 prints the print data received from the controller unit 201 on paper.

The controller unit 201 includes an application-specific integrated circuit (ASIC) 211, a network I/F 212, a local I/F 213, a random access memory (RAM) 214, an engine I/F 215, a communication control unit 216, an antenna 217, an operation unit 218, a read only memory (ROM) 219, and a power supply unit 220.

The network I/F 212 and the local I/F 213 transmit and receive data to and from the portable terminal 30 via the external interface. Here, any of Ethernet®, USB, and the like can be used as the external interface. The engine I/F 215 sends the processed print data to the engine unit 202.

The ASIC 211 includes a central processing unit (CPU) 230. The ASIC 211 processes mainly the print data, and outputs the processed print data to the engine unit 202. The operation unit 218 accepts operation input from a user. The operation unit 218 includes a display screen configured to display a state of the image processing apparatus 20 to the user.

The ROM 219 stores a program. The ROM 219 also temporarily stores user data. The RAM 214 serves as an image expansion area or a work area of the program, when the print data is processed.

The communication control unit 216 and the antenna 217 transmit and receive information to and from the portable terminal 30 by wireless communication. Short-range wireless communication such as Wi-Fi, Bluetooth®, and ZigBee® can be used as the wireless communication.

The power supply unit 220 is an interface that performs wireless power supply in a short distance. The power supply unit 220 wirelessly supplies power to a power receiving apparatus. This power receiving apparatus is mounted with a wireless charging unit using the same standard as that of the power supply unit 220.

It is to be noted that, the CPU 230 reads out the program stored in the ROM 219 and executes this program, thereby implementing functions and processing of the image processing apparatus 20 which are described below.

FIG. 3 is a diagram illustrating an example of a management table stored in the RAM 214 of the image processing apparatus 20. The CPU 230 refers to the management table when determining whether to allow power supply from the image processing apparatus 20 to the portable terminal 30.

The management table stores a device ID, an authentication key, an execution history, and a billing history associated with one another. The device ID is an example of identification information that identifies the portable terminal 30. In the present exemplary embodiment, a device name is used for the device ID. The management table stores the device ID of the portable terminal 30 for which power supply is allowed by the image processing apparatus 20. The authentication key is information used in authentication processing to be described below.

The execution history is history information about services such as image processing, which are executed by the image processing apparatus 20 according to instructions from the portable terminal 30. The billing history is history information about charges to the portable terminal 30 for services executed by the image processing apparatus 20 according to instructions from the portable terminal 30.

The CPU 230 writes the device ID in the management table, when authentication is successful. When a service of the image processing apparatus 20 is used by the portable terminal 30, the CPU 230 stores the contents corresponding to the used service in the execution history and the billing history. For example, when a service of direct print is used twice according to instructions from the portable terminal 30, the CPU 230 stores "Direct Print 2 TIMES" in the execution history, and also stores billing information corresponding to this two-time use in the billing history.

Figure 4:
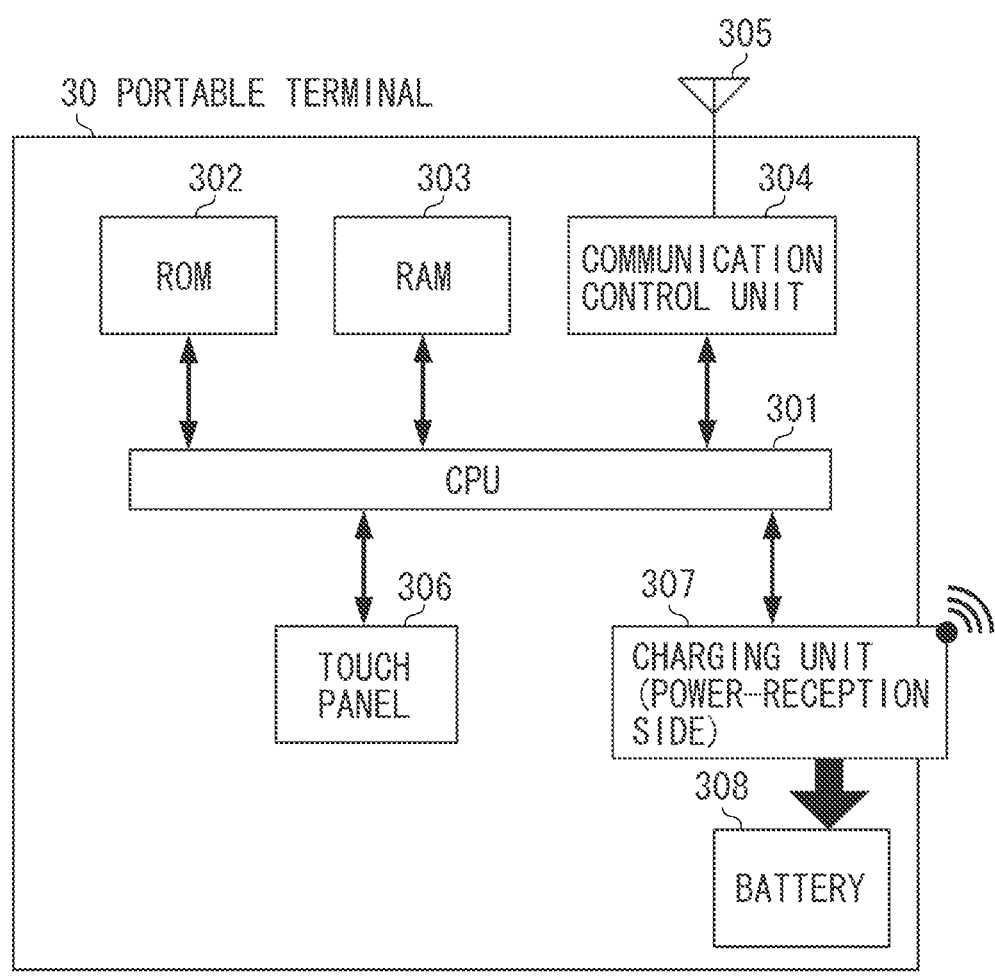
FIG. 4 is a diagram illustrating a portable terminal.

FIG. 4 is a diagram illustrating the portable terminal 30. The portable terminal 30 includes a CPU 301, a ROM 302, a RAM 303, a communication control unit 304, an antenna 305, a touch panel 306, a charging unit 307, and a battery 308. The ROM 302 stores a program that controls the entire portable terminal 30. The CPU 301 executes the program stored in the ROM 302.

The touch panel 306 includes a display screen such as a liquid crystal display (LCD). The touch panel 306 accepts operation input from a user. The touch panel 306 displays information such as a state of the image processing apparatus 20. The charging unit 307 is an interface that charges the battery 308 with the power supplied from the power supply unit 220 of the image processing apparatus 20. In the portable terminal 30, the battery 308 provides the power consumed by the entire portable terminal 30.

It is to be noted that, the CPU 301 reads out the program stored in the ROM 302 and executes this program, thereby implementing functions and processing of the portable terminal 30 which are described below.

Figure 5:
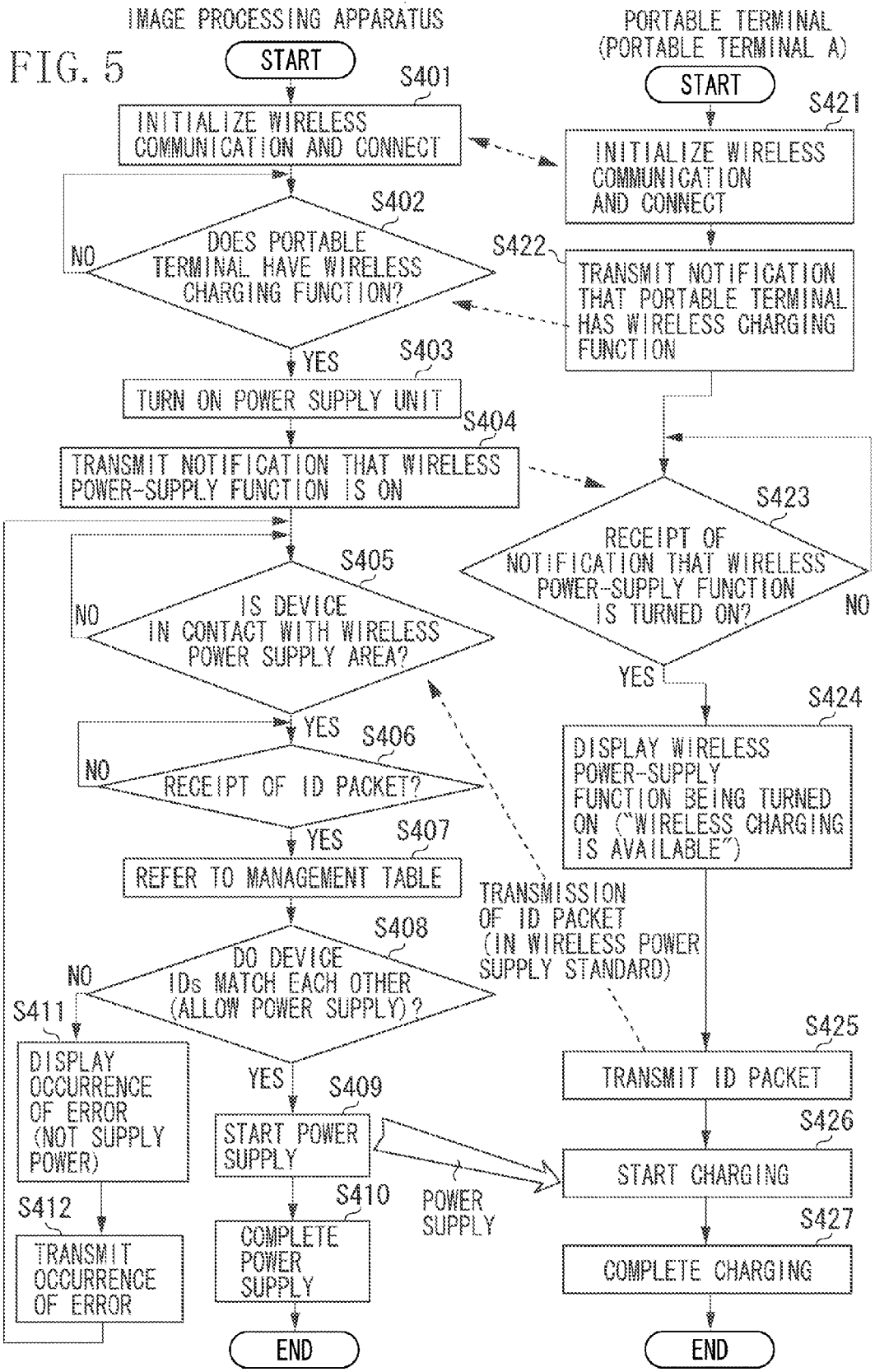
FIG. 5 is a flowchart illustrating power supply processing.

FIG. 5 is a flowchart illustrating processing for power supply performed between the image processing apparatus 20 and the portable terminal 30 (a portable terminal A). In steps S401 and S421, the image processing apparatus 20 and the portable terminal 30 perform processing for connection with each other and authentication of the portable terminal 30 (the authentication processing). The portable terminal 30 transmits the authentication key of the portable terminal to the image processing apparatus 20, for the authentication processing. The image processing apparatus performs the authentication processing based on the received authentication key. Here, the processing in step S401 is an example of detection processing for detecting the portable terminal 30 and the authentication processing for authenticating the portable terminal 30.

It is to be noted that, in steps S401 and S421, the image processing apparatus 20 and the portable terminal 30 are assumed to use wireless communication other than communication using a wireless charging standard. Examples of the wireless communication include short-range wireless communication methods such as Wi-Fi, Bluetooth®, and ZigBee®.

For example, in a case of using Wi-Fi, the image processing apparatus 20 and the portable terminal 30 perform connection and an authentication operation according to Institute of Electrical and Electronics Engineers (IEEE) 802.11 standard. In a case of using Bluetooth®, the image processing apparatus 20 and the portable terminal 30 perform connection and an authentication operation according to IEEE 802.15.1 standard.

In this way, the image processing apparatus 20 performs the authentication at the time of connection by the wireless communication other than the communication using the wireless charging standard. In other words, the image processing apparatus 20 uses an existing authentication function. This enables the image processing apparatus 20 to perform highly reliable authentication.

When the authentication is successful, the CPU 230 stores the authentication key used in the authentication in the management table. Further, the CPU 230 stores the device ID of the successfully authenticated portable terminal 30 in the management table, as a device ID of an allowed device (allowed-device management processing).

In parallel with processing in and after step S422 to be described below, the portable terminal 30 receives a service such as the image processing provided by the image processing apparatus 20 according to a user instruction provided to the touch panel 306. In response, the image processing apparatus 20 updates the execution history and the billing history of the management table according to a state of executing the service provided by the image processing apparatus 20. The image processing apparatus 20 performs such updating in parallel with processing in and after step S402 which will be described below.

In step S422, when the portable terminal 30 has a wireless charging function, the CPU 301 of the portable terminal 30 transmits to the image processing apparatus 20 a notification that the portable terminal 30 has the wireless charging function. This notification is transmitted via the communication control unit 304 and the antenna 305. It is to be noted that, as a way of communication from the portable terminal 30, a dedicated command is used. In another example, a flag in a transmission packet may be used.

Upon receipt of the notification that the portable terminal 30 has the wireless charging function from the portable terminal 30 (YES in step S402), the CPU 230 of the image processing apparatus 20 advances the processing to step S403. In step S403, the CPU 230 activates the power supply unit 220. Specifically, in a state before the processing in step S403, the power supply unit 220 is not supplied with power, and the CPU 230 starts supplying the power to (activates) the power supply unit 220 in step S403. In another example, a control signal to be sent to the power supply unit 220 is set inactive in a state before the processing in step S403, and the CPU 230 changes (activates) the control signal to active in step S403.

In step S404, the CPU 230 transmits a notification to the portable terminal 30 via the communication control unit 216 and the antenna 217, the notification indicating that a wireless power-supply function is turned ON by the power supply unit 220. Subsequently, upon receipt of the notification that the wireless power-supply function is turned ON (YES in step S423), the CPU 301 of the portable terminal 30 advances the processing to step S424. In step S424, the CPU 301 causes the touch panel 306 to display information indicating that the wireless power-supply function is turned ON.

Figure 6:
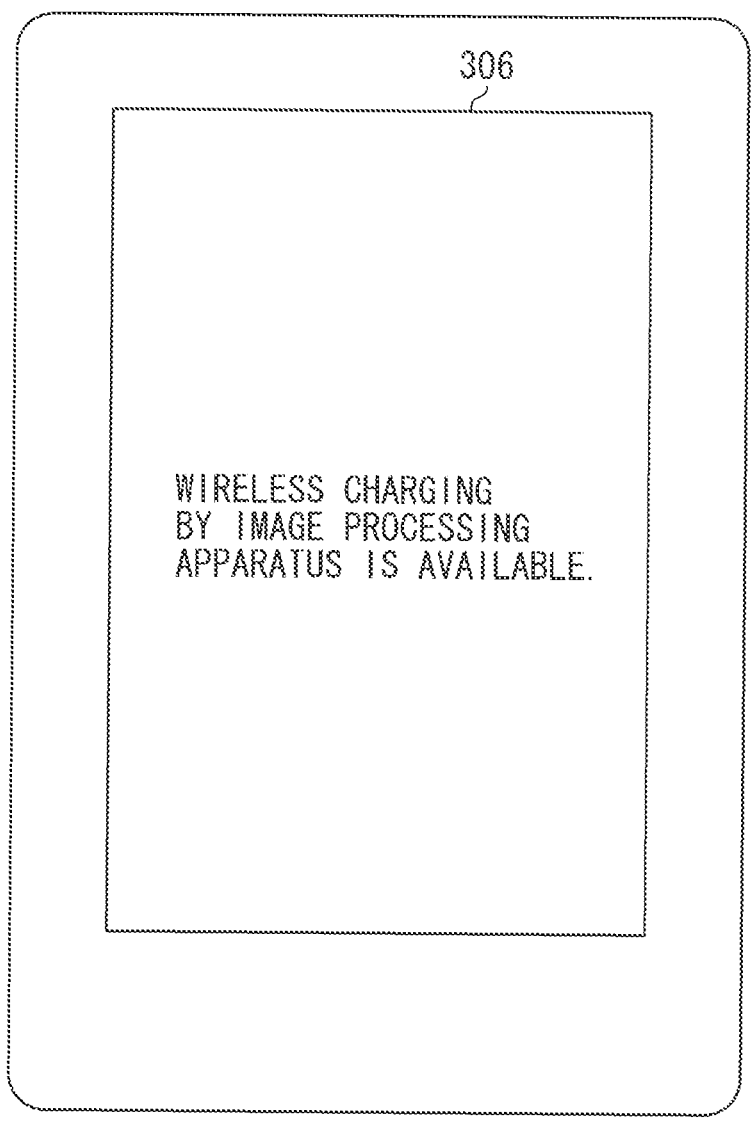
FIG. 6 is a diagram illustrating a display example of a touch panel.

FIG. 6 illustrates an example of displaying the information indicating that the wireless power-supply function is turned ON. This allows the user of the portable terminal 30 to know that the wireless power-supply function is available.

In step S425, when the user of the portable terminal 30 brings the charging unit 307 into contact with the power supply unit 220 of the image processing apparatus 20, the CPU 301 transmits an ID packet including the device ID that identifies the portable terminal 30, by the communication using a wireless power supply standard. Here, the device ID is an example of the identification information that identifies the portable terminal 30.

Meanwhile, in step S405, the CPU 230 of the image processing apparatus 20 detects whether the charging unit 307 of the portable terminal A is in contact with a power supply area where the wireless power supply is allowed. When YES in step S405, the CPU 230 advances the processing to step S406. In step S406, the CPU 230 of the image processing apparatus 20 determines whether the ID packet is received (receiving processing). When YES in step S406, the CPU 230 advances the processing to step S407.

In step S407, the CPU 230 refers to the management table, thereby comparing the received device ID with the device ID associated with the authentication key referred to in the authentication processing in step S401. In step S408, the CPU 230 determines whether the received device ID and the device ID associated with the authentication key match each other. When these devices ID match each other (YES in step S408), the CPU 230 determines to allow the power supply and advances the processing to step S409. It is to be noted that the processing in step S407 and step S408 is an example of power-supply control processing.

In step S409, the CPU 230 instructs the power supply unit 220 to start power supply to the portable terminal 30 (power-supply control processing). The power supply unit 220 then starts the power supply (power supply processing). In response, in step S426, the CPU 301 of the portable terminal 30 starts charging the battery 308 via the charging unit 307. Then, in step S427, the CPU 301 of the portable terminal 30 completes the charging when the battery 308 is fully charged. In response, in step S410, the CPU 230 completes the power supply. This ends the power supply processing.

On the other hand, when the device IDs do not match each other (NO in step S408), the CPU 230 determines not to allow the power supply, and advances the processing to step S411. In step S411, the CPU 230 causes the display screen of the operation unit 218 to display occurrence of an error. In step S412, the CPU 230 transmits a notification that the error has occurred to the portable terminal 30 by the communication using the wireless communication standard, and ends the power supply processing. In this way, when determining not to allow the power supply, the CPU 230 does not perform the power supply to the portable terminal 30.

In the power supply processing between the image processing apparatus 20 and the portable terminal A (the portable terminal 30) registered in the image processing apparatus 20 as a power supply target, the CPU 230 determines to allow the power supply to the portable terminal A in step S408. The CPU 230 then advances the processing to step S409. In step S409, the CPU 230 starts the power supply to the portable terminal A. In response, in step S426, the CPU 301 of the portable terminal A starts receiving the power and charging the battery 308 with the received power.

In this way, the image processing apparatus 20 can allow the power supply to the successfully authenticated portable terminal 30, and supply the power to the portable terminal 30 for which the power supply is allowed.

Figure 7:
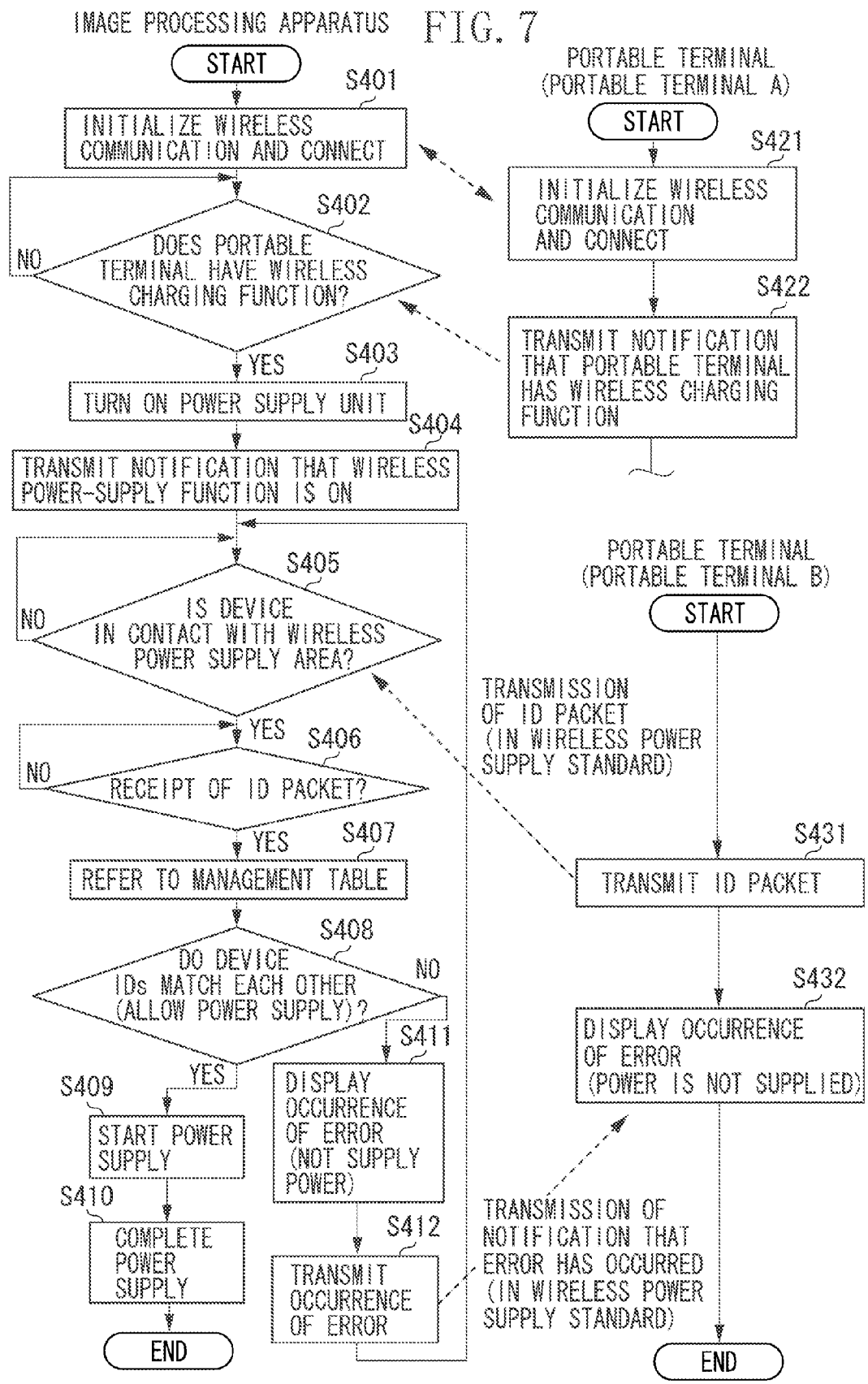
FIG. 7 is a flowchart illustrating power supply processing.

Now, a case of receiving an ID packet from a portable terminal B (the portable terminal 30) will be described. The portable terminal B is not registered in the image processing apparatus 20 as a power supply target. In this case, the following processing is performed, which will be described with reference to FIG. 7. It is to be noted that, the device ID and the authentication key of the portable terminal B are not registered in the management table. In addition, the processing for the connection and the authentication by the wireless communication in step S421 is not performed.

In step S431, when the portable terminal B is brought into contact with the power supply unit 220 of the image processing apparatus 20, the portable terminal B transmits an ID packet including the device ID by the communication using the wireless power supply standard. In response, the CPU 230 of the image processing apparatus 20 detects the contact of the portable terminal B in step S405, and receives the ID packet in step S406.

In step S407, the CPU 230 refers to the management table. However, the authentication processing between the image processing apparatus 20 and the portable terminal B has not been performed, and the device ID of the portable terminal B is not registered in the management table.

Therefore, in step S408, the CPU 230 determines not to allow the power supply, and advances the processing to step S411. In step S411, the CPU 230 causes the operation unit 218 to display occurrence of an error. In step S412, the CPU 230 transmits to the portable terminal B a notification that the error has occurred. This ends the power supply processing.

Figure 8:
FIG. 8 is a diagram illustrating a display example of a touch panel.

Meanwhile, in step S432, the CPU 301 of the portable terminal B receives the notification, which indicates the occurrence of the error and was transmitted in step S412. The CPU 301 then causes the touch panel 306 to display this notification, and ends the power supply processing. FIG. 8 illustrates an example of displaying the occurrence of the error. This enables a user of the portable terminal 30 to know that the power supply is not allowed.

In this way, the image processing apparatus 20 can prohibit the power supply to the portable terminal 30 that is not successfully authenticated.

According to each of the above-described exemplary embodiments, a power supply target can be appropriately controlled.

In a modification of the wireless power-supply system according to the present exemplary embodiment, the image processing apparatus 20 may determine whether to supply the power, based on not only the device ID in the management table but also at least one of the execution history and the billing history. For example, the image processing apparatus 20 may allow the power supply to the portable terminal 30, when the device ID of the portable terminal 30 matches the device ID associated with the authentication key, and the execution history of the portable terminal 30 is stored.

Further, in another example, the image processing apparatus 20 may determine whether to supply the power, based on not only the device ID but also the type and/or information of the wireless power supply standard of the portable terminal 30. In this way, the image processing apparatus 20 can determine whether to supply the power, based on an appropriate condition according to a form of use.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-080534 filed Apr. 8, 2013, which is hereby incorporated by reference herein in its entirety.

What is claimed is:

1. A power supply apparatus having a wireless power supply function of wirelessly supplying power to an external apparatus based on a first standard and a wireless communication function of performing wireless communication based on a second standard different from the first standard, the power supply apparatus comprising:

a first receiving unit configured to receive, from an external apparatus, an authentication key corresponding to the wireless communication function;

an authentication unit configured to perform, based on the authentication key, authentication processing corresponding to the wireless communication function;

a registration unit configured to register identification information of the external apparatus in a management table in a case where the authentication processing has ended successfully;

a second receiving unit configured to receive, from the external apparatus, identification information of the external apparatus via communication corresponding to the wireless power supply function;

a determining unit configured to determine whether or not the identification information received by the second receiving unit has been registered in the management table; and a power supply unit configured to wirelessly supply power to the external apparatus in a case where the determining unit has determined that the identification information received by the second receiving unit has been registered in the management table, for which the power supply is allowed by the power-supply control unit, wherein, in a case where the determining unit has determined that the identification information received by the second receiving unit has not been registered in the management table, the power supply unit does not supply power to the external apparatus.

2. The power supply apparatus according to claim 1, wherein history information of a service executed by the power supply apparatus is further registered in the management table, and wherein, in a case where the determining unit has determined that the identification information received by the second receiving unit has been registered in the management table and history information corresponding to the external apparatus has been registered in the management table, the power-supply unit wireless supplies power to the external apparatus.

3. The power supply apparatus according to claim 1, further comprising:

a display unit configured to display error information in a case where the determining unit has determined that the identification information received by the second receiving unit has not been registered in the management table.

4. The power supply apparatus according to claim 1, wherein the power supply apparatus is a printing apparatus configured to perform printing.

5. The power supply apparatus according to claim 2, wherein the service includes at least a direct print service.

6. A power supply method having a wireless power supply function of wirelessly supplying power to an external apparatus based on a first standard and a wireless communication function of performing wireless communication based on a second standard different from the first standard, the power supply method comprising:

receiving, from an external apparatus, an authentication key corresponding to the wireless communication function;

performing, based on the authentication key, authentication processing corresponding to the wireless communication function;

registering identification information of the external apparatus in a management table in a case where the authentication processing has ended successfully;

receiving, from the external apparatus, identification information of the external apparatus via communication corresponding to the wireless power supply function;

determining whether or not the identification information received has been registered in the management table; and wirelessly supplying power to the external apparatus in a case where the determined identification information received has been registered in the management table, wherein, in a case where the determined identification information received has not been registered in the management table, not wirelessly supplying power to the external apparatus.

7. A non-transitory computer-readable storage medium that stores computer executable instructions that cause a computer to execute a method to wirelessly supply power to an external apparatus based on a first standard and a wireless communication function of performing wireless communication based on a second standard different from the first standard, the method comprising:

receiving, from an external apparatus, an authentication key corresponding to the wireless communication function;

performing, based on the authentication key, authentication processing corresponding to the wireless communication function;

registering identification information of the external apparatus in a management table in a case where the authentication processing has ended successfully;

receiving, from the external apparatus, identification information of the external apparatus via communication corresponding to the wireless power supply function;

determining whether or not the identification information received has been registered in the management table; and wirelessly supplying power to the external apparatus in a case where the determined identification information received has been registered in the management table, wherein, in a case where the determined identification information received has not been registered in the management table, not wirelessly supplying power to the external apparatus.

\* \* \* \* \*